July 26, 1927.
L. H. HEMPLEMAN
1,637,222
CALCULATING DEVICE
Filed Aug. 12, 1926
2 Sheets-Sheet 1
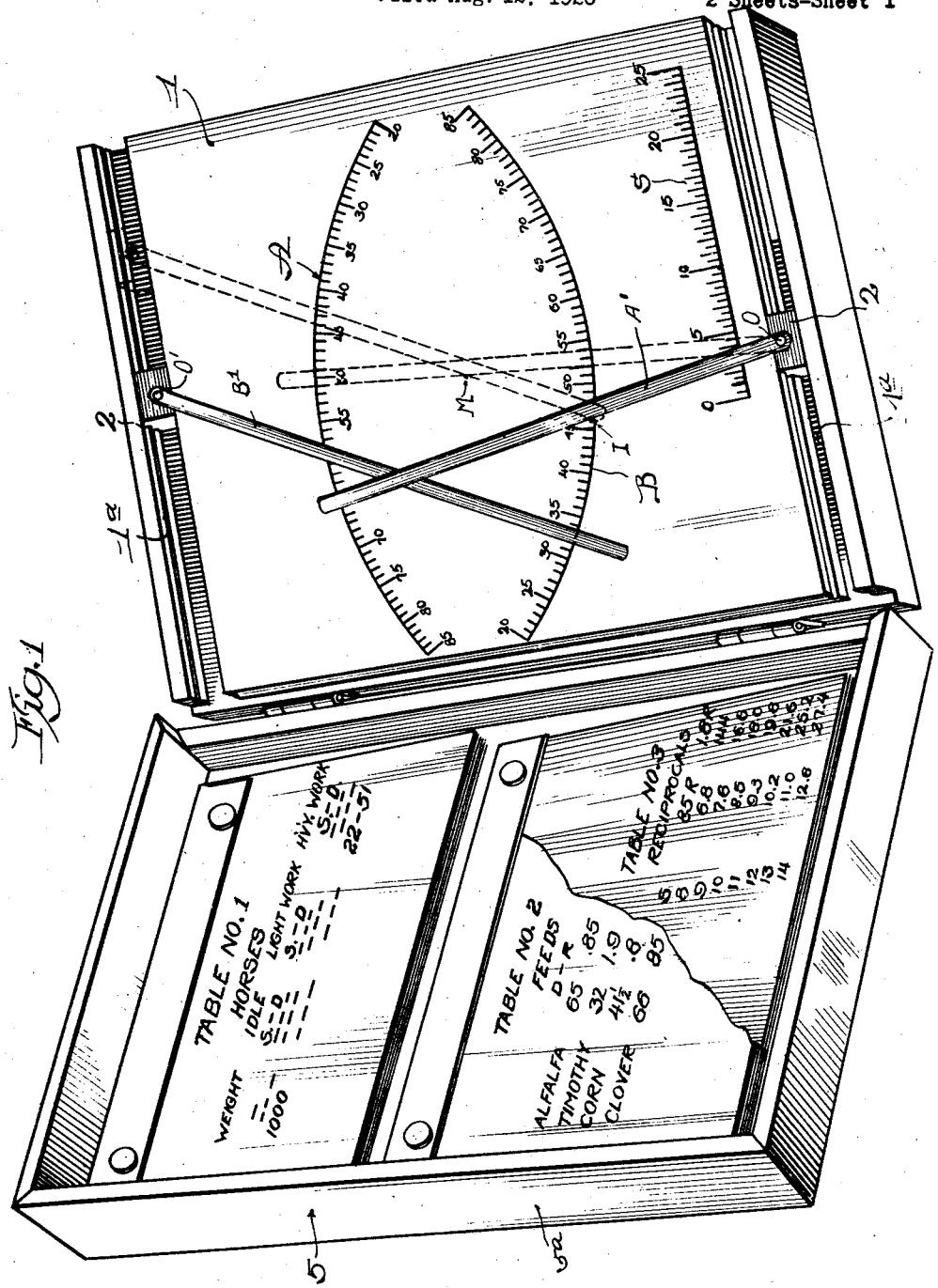

July 26, 1927.
L. H. HEMPLEMAN
1,637,222
CALCULATING DEVICE
Filed Aug. 12, 1926    2 Sheets-Sheet 2
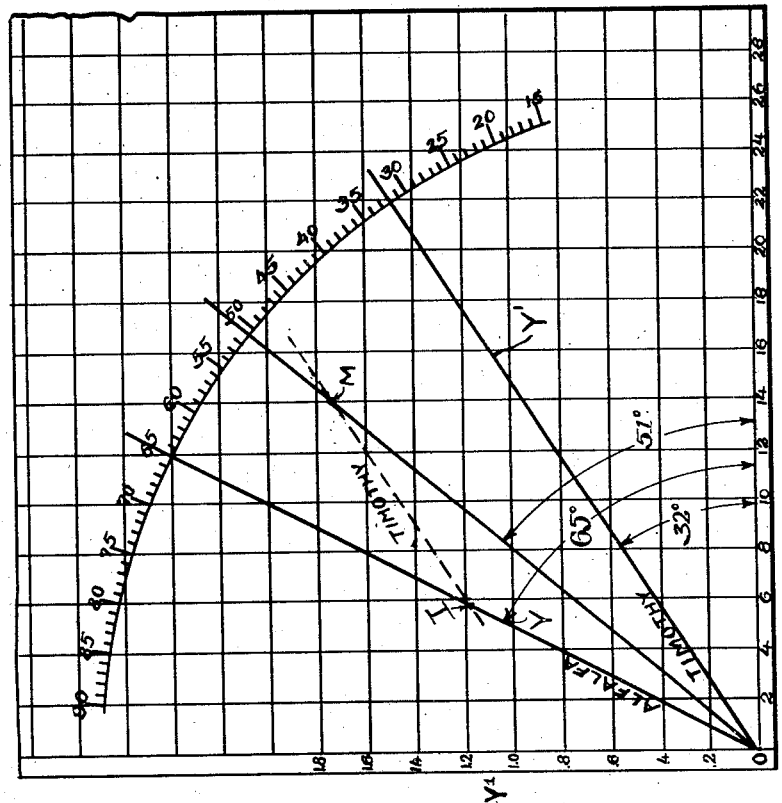
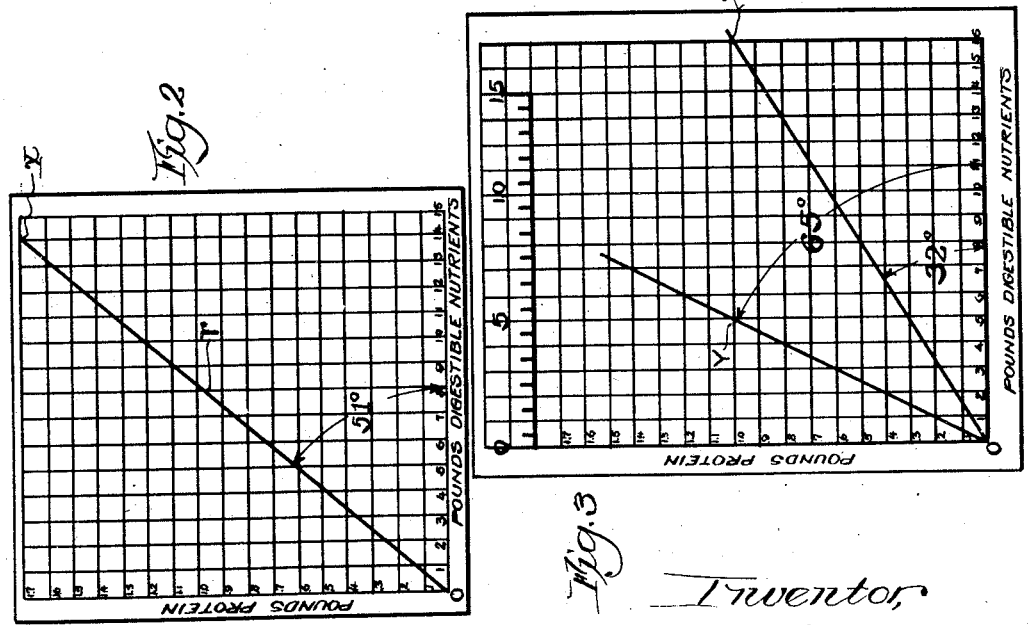
Inventor,
Lynn H. Hempleman Patented July 26, 1927.

1,637,222

UNITED STATES PATENT OFFICE.

LYNN H. HEMPLEMAN, OF TWIN FALLS, IDAHO.

CALCULATING DEVICE.

Application filed August 12, 1926. Serial No. 128,732.

This invention relates to improvements in calculating devices particularly adapted for the solution of problems involving the determination of unknown quantities to be combined to give a desired resultant. As illustrative of a particular use for a calculating device of this character, is the determination of balanced rations for live stock and poultry, where two or more feeds are to be mixed. In the solution of such a problem, certain values are known, viz, the amount of protein and digestible nutrients required for a particular kind of animal of a given weight and condition, and the relative proportion or ratio of proteins to digestible nutrient in the various feeds available, these values having been determined by experiment and analysis, and made available in the form of tables, which are used with the device. The unknown quantities are, therefore, the amount by weight of each feed which will make up a balanced ration for a given period of time.

Problems of this character can manifestly be solved mathematically by the use of simultaneous equations. They can be also solved by the graphic method of plotting known values on co-ordinate paper, but either method requires considerable knowledge of mathematics, which is either not possessed by the average person dealing with problems of this nature, or if possessed, the time or inclination to labor over the solution is lacking.

The purpose of the invention is, therefore, to provide a device which will solve these problems mechanically, that is, by manipulating certain parts, according to directions and with reference to accompanying tables, whereby the problem may be solved, by any person, without knowledge of the mathematical principles on which the operation of the device is based.

The calculation of balanced rations has been mentioned particularly, since to my knowledge no means has yet been devised to enable the farmer or stockman to feed his stock scientifically and in accordance with the results of agricultural research. However, it can also be adopted for the calculation of many other and similar problems, such as the computing of the sizes of canals and irrigation ditches for required volumes of water on varying slopes of land, and many other problems of a mineralogical, geographical, chemical or mechanical nature, In disclosing the invention, the mathematical principles underlying the device will be set forth, together with such graphic charts, as will enable a person to visualize the steps performed by the device.

In the accompanying drawings,

Figure 1 is a perspective view of a preferred form of the calculating device.

Figure 2 is a diagrammatic chart showing the manner of plotting the values for S and D, representing the ration requirements of a particular animal.

Figure 3 is a similar chart showing the manner of plotting the values for D and R for the particular feeds to make up the rations; and Figure 4 is a graphic representation of the solution of a problem, arrived at mechanically by the device.

The device as a mechanical structure is comparatively simple in construction consisting chiefly of a board 1, rectangular in shape and having degree and linear scales marked thereon, either by printing the same directly on the face of the board or by applying a sheet of paper to the face of the board on which the scales are printed. Along the opposite edges of the board are formed grooves $1^a$, $1^a$ in which are mounted sliding blocks 2, carrying flat strips of metal pivoted thereto to swing in arcs across the face of the board, and form the indicators or pointers A' and B' of the device. In the present disclosure there are two degree scales A and B, and a pointer A' and B' associated with each scale. Thus the upper scale A and lower pointer A' are associated, and lower scale B and upper pointer B' likewise associated. Moreover, these pointers in extending to their respective scales, are designed to cross or intersect each other, and for reasons that will later be understood. The arcs of these degree scales A and B are taken about fixed points O and O' respectively, representing the origins of the scales, and located at the pivotal points of the pointers A' and B', when positioned to indicate degree readings on said scales. The arc of these degree scales is about 70°, scale A being numbered from right to left, and scale B from left to right.

Also appearing on the face of the board is a linear scale S divided in major units which are subdivided into ten minor units. The scale is numbered from zero (0) to say 25, with the major units indicated by numerals 5, 10, 15, 20 and 25, To complete the device, a hinged cover 5 is provided so that it can be carried and the face of the board protected. The cover is hinged to one edge of the board, and has side walls 5ᵃ which enclose the remaining edges of the board. To the inside of the cover may be attached the several tables containing the data from which the known values are obtained. The nature of these tables and the manner in which the data is obtained and tabulated, will be later described, although it would be impractical to reproduce complete tables covering all varieties of feed and all kinds of domestic animals.

Perhaps the clearest understanding of the manner of using the calculator may be had from the solution of an actual problem, first outlining the principles involved.

The problem of furnishing a balanced ration of two or more feeds depends on two factors, first, the particular animal or animals to be rationed, and, second, the ingredients of the feeds to be used. In the example to be given, the animal will be assumed to be a work horse weighing 1000 pounds. Experimental tables have been worked out giving the amount of protein and digestible nutrients which such a horse requires per day, it being manifest that the weight or size of the animal as well as use being made of the animal, are the determining factors of feed requirements.

Thus a table, which will be designated as Table No. 1, is prepared for use with the calculating device covering various kinds, size and condition of animals. In this so-called Table No. 1, there are two values or indicia corresponding to each weight and condition of animals, and arranged in columns under letters S and D,—S representing distances or spaces on the linear scale S on the board, and D representing degrees on the degree scale A. As already stated, the basis for these values are arrived at experimentally, although the values themselves are arrived at by graphic methods as will hereinafter be explained.

The next step in the solution of this problem is the determination of proportionate amount of protein to digestible nutrients in a mixture of two or more feeds for the particular animal to be rationed, the known values being the ratio of protein to digestible nutrients in the several feeds that may be used, these being set forth in another table, which will be called Table No. 2. The data in this table is obtained from an analysis of the feed, and the values attached to them are arranged in columns in the same manner as in Table No. 1, but under the headings D and R, the meaning of which will be presently explained.

Thus having determined the requirements of the animal and the proportion which certain given feeds will contribute to the required ration, the final step is to determine how many pounds of each is required to give the proper or balanced ration.

The general procedure having been explained, the make-up of the tables and indicia will now be described.

To arrive at the values of S and D in Table No. 1, it is preferable to use the graphic method of plotting of points on what is known as co-ordinate paper, using pounds of protein as the ordinates and pounds of digestible nutrients as abscissa. The chart, Figure 2, shows the manner in which these values S and D are found. Thus, starting with the known fact that a work horse weighing 1000 pounds requires say 1.7 pounds of protein and 14 pounds of digestible nutrients per day, these values are laid off on the ordinate or vertical axis and the abscissa or horizontal axis. The resultant of these values will be a point X. A line drawn through O (or origin) and X is the resultant $r$ of these ordinates. The angle which this line makes with the horizontal is 51° and this is the value D for this particular horse. Likewise, the length of this diagonal line or resultant measured on the linear scale S is 22 spaces or units of the scale S and is the corresponding value for S in Table No. 1. In the same manner, other values for S and D are established for all animals, according to weight and condition.

In the same manner, values of D and R are found for the various feeds listed in Table No. 2, where D is slope or inclination of the resultant line measured in degrees and R is the reciprocal of the distance or length of the line representing each feed as plotted on coordinate paper, using protein and digestible nutrient as ordinates and abscissa as before. In the example to be solved, the ration for the horse is to be a mixture of timothy hay and alfalfa hay. Now, to find the value of D for timothy and alfalfa:

The ratio of protein to digestible nutrients in timothy hay has been found to be 1 to 4.87 and for alfalfa hay to be 1 to 16.1. Thus, laying off the proteins per unit of feed as the ordinates and the digestible nutrients as abscissa on a chart (Figure 3) of the same scale as the chart of Figure 2 it is found that the resultant lines passing through the plotted points Y for timothy and Y′ for alfalfa hay, slope at angles of 32° and 65°, respectively, to the horizontal, these being the values of D for these feeds. The chart shown in Figure 3 shows the manner in which these values are obtained graphically. Near the top of the chart (Figure 3) is reproduced the linear scale S, it being noted that the divisions thereof correspond to the divisions on the X coordinate of the chart.

The chart of Figure 4 shows the manner in which the problem is solved graphically to give the same results as are obtained mechanically by the use of the device. In this chart the proteins are plotted as the ordinates and the digestible nutrients as abscissa, as in the other charts (Figures 2 and 3).

Now, according to the chart (Figure 2) the ration for the horse must contain 1.7 pounds of protein and 14 pounds of digestible nutrient or in a ratio of about 1 to 8.1, as represented by a line sloping 51° to the horizontal, and 22 spaces or units in length, these being the values of D and S, respectively. Thus plotting this line through the origin 0 and measuring 22 spaces, a point M is determined, which represents graphically the required protein and digestible nutrient content for the mixed feed for the horse for which the ration is being prepared. Now if two lines are drawn through O (or origin) on the chart, one at 32° and the other at 65°, measured on the degree scale with O as the center, the former will represent the ratio for timothy hay and the latter for alfalfa hay as determined from the chart (Figure 3).

To obtain graphically the relative amounts of timothy and alfalfa required to produce the required amount of protein and digestible nutrient, viz, 1.7 and 14 pounds, respectively, a line parallel to the slope line for timothy hay is drawn through point M to the point I where it intersects the slope line for alfalfa. Thus there is a broken line OIM from O to M, one section OI representing alfalfa, and the other IM, timothy.

But these lines do not represent graphically the proportion in actual pounds of each feed, to give the required amount of protein and digestible nutrient in the ration, but merely a distance ($d$) measured on the scale S which must be multiplied by the reciprocal ($R$) of the distance ($d$) in order to determine the actual amounts required.

The value for R is obtained by solving the equation $$d = b\sqrt{100 + \frac{1}{n+2}},$$

where
$d$ — is the distance,
$b$ — is the number of pounds of protein in one pound of feed,
$n$ — is the ratio of protein to digestible nutrient in the feed.

Thus for alfalfa hay, $$d = .106\sqrt{100 + \left(\frac{1}{\frac{1}{16.1}}\right)} x2 = 1.18$$

and $$R = \frac{1}{d} \text{ or } \frac{1}{1.18} = .85$$

Similarly, for timothy hay, $$d = .03\sqrt{100 + \left(\frac{1}{\frac{1}{16.1}}\right)} x2 = .571$$

and $$R = \frac{1}{d} \text{ or } \frac{1}{.571} = 1.75$$

The amounts in pounds corresponding to the several values for R are found in still a third table which may be called Table No. 3. This table consists of columns with headings for R values vs. .4, .45, .5 and so on up to 1.2, 1.25, 1.3, etc. Under each of these headings are corresponding values for the distances measured on the scale S.

Thus to determine the amount of alfalfa hay required, the distance ($d$) of the line OI representing alfalfa, is measured on the scale S, and found to be 14. Reading down the column under .85R and opposite 14, the amount 12.6 is found which is the amount of 11.3 pounds of alfalfa, this figure being sufficiently accurate for practical consideration.

Similarly, for timothy, the reading is made in the column under 1.75R and opposite 9 which is the length of the line representing timothy on the scale S. This reading is 16.2, which represents the amount of timothy hay required.

Thus a mixture of 12.6 pounds of alfalfa and 16.2 pounds of timothy will provide 1.7 pounds of protein and 14 pounds of digestible nutrients, the amount initially determined from Table No. 1, as the daily ration requirement for a working horse weighing 1000 pounds.

As already pointed out, by manipulating the device, the same results are obtained as have been worked out on the three charts (Figures 2, 3 and 4). Thus bearing in mind the problem already solved, the operation of the device will be understood from the following: Having determined from Table No. 1 the values of S as 22, and D as 51, the pointer A' is placed at the point O and swung to the point 51° on the degree scale A (shown in dotted lines). Then measuring from the point O, 22 spaces on the scale S by means of divider or compass, gives the point M (see Figure 2) which is marked by a pin or pencil point. This determines the required feed for the horse.

The next step is to set the same pointer A' to the value D for alfalfa, namely, 65°, on the A degree scale (shown in full lines). This gives a line whose slope is 65° to the horizontal.

Next, the B' pointer is placed at the value D for timothy on the degree scale B, namely 32°, thus giving a line whose slope is 32° to the horizontal, in this case, the top edge of the board (full line position). Now without angularly displacing the B' pointer, it is shifted bodily along the groove until its straight edge passes through the point M. In this position (shown in dotted lines), the same edge intersects the corresponding edge of the A' pointer at an angle, the distance from the point of intersection I to the point or origin O, and to the point M, being the lines representing alfalfa and timothy just as in the chart (Figure 4). These distances are measured on the scale S, and by referring to Table No. 3 of reciprocals (R), as already explained, the required amount in pounds of alfalfa and timothy is found, namely, 12.6 pounds and 16.2 pounds, respectively.

This operation is a matter of only a few moments, and compared with the labor required to obtain the same results by plotting the lines and angles by means of coordinate paper, is an exceedingly rapid and simple operation.

The advantage of the device is, therefore, the solution of problems which the average person is unable to solve by other methods, and with very little time, once the mode of manipulating the device and using the tables is understood.

Such problems may be solved mathematically, by solving equations representing the slopes of the lines, for the unknown values, and then solving a simultaneous equation for the final results. However, the mathematical solution would only be of interest as a check on the results obtained mechanically by the device, and therefore may be omitted, and particularly since the graphic method is sufficiently accurate for that purpose.

It may be stated that mixtures of more than two feeds may also be solved by the use of this device, although these problems are more involved, as assumed values for D and S must be used for all but two of the feeds in order to find the unknown values for these first, and then solve the problem for the other feeds. This, of course, may require several trials before the correct solution is arrived at.

Having set forth the purposes and advantages of the device embodying the invention, I claim:

1. A calculating device of the character described, comprising a board, a plurality of degree scales on said board and degree indicators pivoted on said board to move about the center of each degree scale, one of said indicators being shiftable bodily in a predetermined line.

2. A calculating device for the purpose described, comprising a board having two degree scales marked thereon, with the geometric centers thereof located at opposite edges of said board, grooves extending along said edges, blocks slidably mounted in said grooves, indicators associated with said degree scales and pivotally mounted on said blocks.

3. A calculating device for the purpose described comprising a board, arcs marked on said board about centers located substantially midway two opposite edges of said board, and divided into degrees indicating the slope angles to a predetermined line and degree indicators associated with each scale and comprising pointers pivoted to swing on the arcs thereof, one of said points being shiftable bodily along a predetermined straight line.

4. A calculating device for the purpose described comprising a board, degree scales marked on said board, a degree indicator associated with each scale and adapted to be swung about the origin of its scale to locate lines of predetermined slope to a fixed horizontal line, one of said indicators being movable bodily along a line parallel to said horizontal line and to intersect the other indicator when shifted a predetermined distance from the origin of its associated scale.

5. A calculating device comprising a board having a degree scale marked thereon and indicating degrees of slope to a predetermined line passing through the origin of said scale, a plurality of degree indicators adapted to locate lines of given slope on said board, one of said indicators being shiftable bodily along said first-mentioned line to locate lines parallel to lines of slope previously located thereby and intersecting a line of slope located by the other of said indicators.

6. A calculating device comprising a board having a degree scale marked thereon and indicating degrees of slope relative to a predetermined line passing through the geometric center of said degree scale, a linear scale of predetermined units of linear measure, and a pivoted indicator mounted on said board and adapted to locate on said board a plurality of lines of predetermined slope, and capable of being shifted bodily along said first-mentioned line to determine a point of intersection of one line of predetermined slope, and a line parallel to another line of predetermined slope, and passing through a point located at a predetermined number of linear units from the origin of said scale as measured along a third line of predetermined slope.

Signed at Twin Falls, Idaho, this 31st day of July, 1926.

LYNN H. HEMPLEMAN.